US012598229B1

(12) United States Patent
Chau et al.

(10) Patent No.: US 12,598,229 B1
(45) Date of Patent: Apr. 7, 2026

(54) METHODS AND SYSTEMS FOR LOADING LARGE DATASETS ACROSS CLOUD NETWORKS

(71) Applicant: Synchrony Bank, Stamford, CT (US)

(72) Inventors: David Chau, Stamford, CT (US); Tarun Saha, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 19/088,500

(22) Filed: Mar. 24, 2025

(51) Int. Cl.
*H04L 67/1031* (2022.01)
*H04L 67/53* (2022.01)

(52) U.S. Cl.
CPC .......... *H04L 67/1031* (2013.01); *H04L 67/53* (2022.05)

(58) Field of Classification Search
None
See application file for complete search history.

(56) References Cited

U.S. PATENT DOCUMENTS 6,829,611 B2 * 12/2004 Majewski ............... G06F 16/25
707/812
7,039,784 B1 * 5/2006 Chen .................... G06F 3/0638
709/215
2007/0028133 A1 * 2/2007 Izutsu ..................... H04L 67/06
714/4.11
2014/0164515 A1 * 6/2014 Maltbie .................. H04L 67/06
709/204
2016/0316388 A1 * 10/2016 Rosen ............... H04W 28/0231
2017/0161056 A1 * 6/2017 Raanan ................. G06F 3/0637
2017/0346924 A1 * 11/2017 Xiong ................... G06F 3/0689
2021/0234942 A1 * 7/2021 Ganapathi .............. H04L 69/40

* cited by examiner

*Primary Examiner* — Ranodhi Serrao
(74) *Attorney, Agent, or Firm* — Polsinelli LLP

(57) ABSTRACT

A distributed acquisition environment downloads a snapshot of a large dataset from one or more remote environments. The download may occur regularly to enable the distributed acquisition environment to operate on a nearly up-to-date instance of the large dataset. The download may begin when a computing device receives a request to load a dataset into memory of the distributed acquisition environment. The dataset may be divided into one or more data segments. Each data segment of the one or more data segments is associated with a data loader of one or more data loaders of the distributed acquisition environment. The one or more data segments are transferred to a temporary location within a cloud environment. The data loaders of the distributed acquisition environment to then download the one or more data segments from the temporary location.

18 Claims, 5 Drawing Sheets

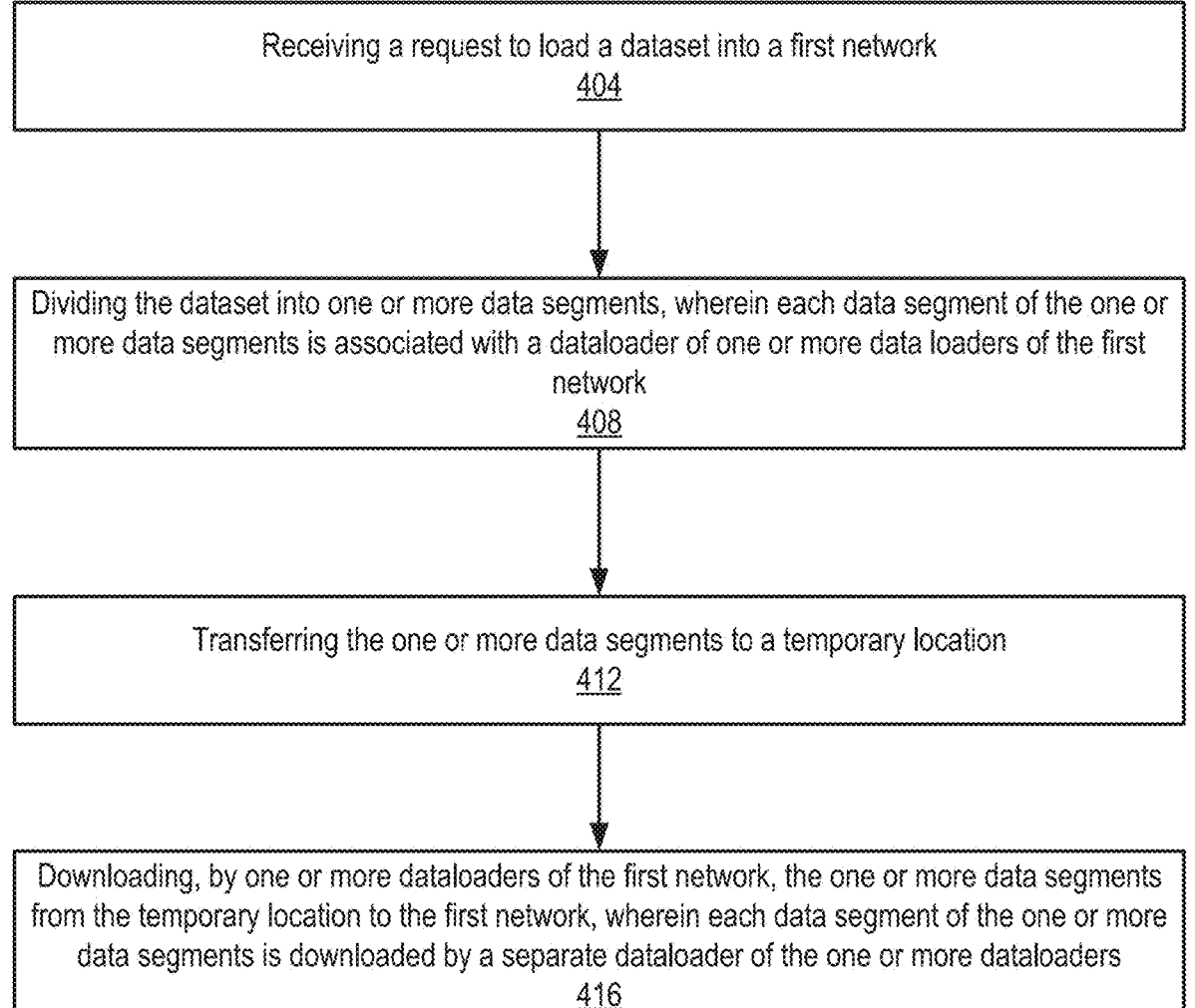

Receiving a request to load a dataset into a first network
404

Dividing the dataset into one or more data segments, wherein each data segment of the one or more data segments is associated with a dataloader of one or more data loaders of the first network
408

Transferring the one or more data segments to a temporary location
412

Downloading, by one or more dataloaders of the first network, the one or more data segments from the temporary location to the first network, wherein each data segment of the one or more data segments is downloaded by a separate dataloader of the one or more dataloaders
416

FIG. 4

METHODS AND SYSTEMS FOR LOADING LARGE DATASETS ACROSS CLOUD NETWORKS

TECHNICAL FIELD

This disclosure relates generally to loading datasets in cloud networks, and more particularly to efficient loading of large datasets across cloud networks.

BACKGROUND

Cloud environments and other distributed environments enable the distribution of data across multiple environments and memory locations. Services that operate within these distributed environments distribute data across environments, networks, and memory locations. For example, one or more processes operating within a particular environment or memory region may download a dataset from other environments or memory regions. As services grow, so does the data processed by the services requiring more and more data to be downloaded to the particular environment or memory region. Thus, the services may spend large quantities of time and bandwidth simply transferring data. For services that rely on live data that is regularly updated from the other environments or memory regions, the time and bandwidth spent updating the local instance of the datasets may severely impact the operations of the services.

SUMMARY

Methods are described herein for loading large datasets across cloud environments. The methods may include: receiving a request to load a dataset into a first network; dividing the dataset into one or more data segments, wherein each data segment of the one or more data segments is associated with a data loader of one or more data loaders of the first network; transferring the one or more data segments to a temporary location; and downloading, by one or more data loaders of the first network, the one or more data segments from the temporary location to the first network, wherein each data segment of the one or more data segments is downloaded by a separate data loader of the one or more data loaders.

The systems described herein for loading large datasets across cloud environments. The systems may include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 illustrates a flowchart of an example process for transferring a dataset via one or more environments according to aspects of the present disclosure.

DETAILED DESCRIPTION

Figure 1:
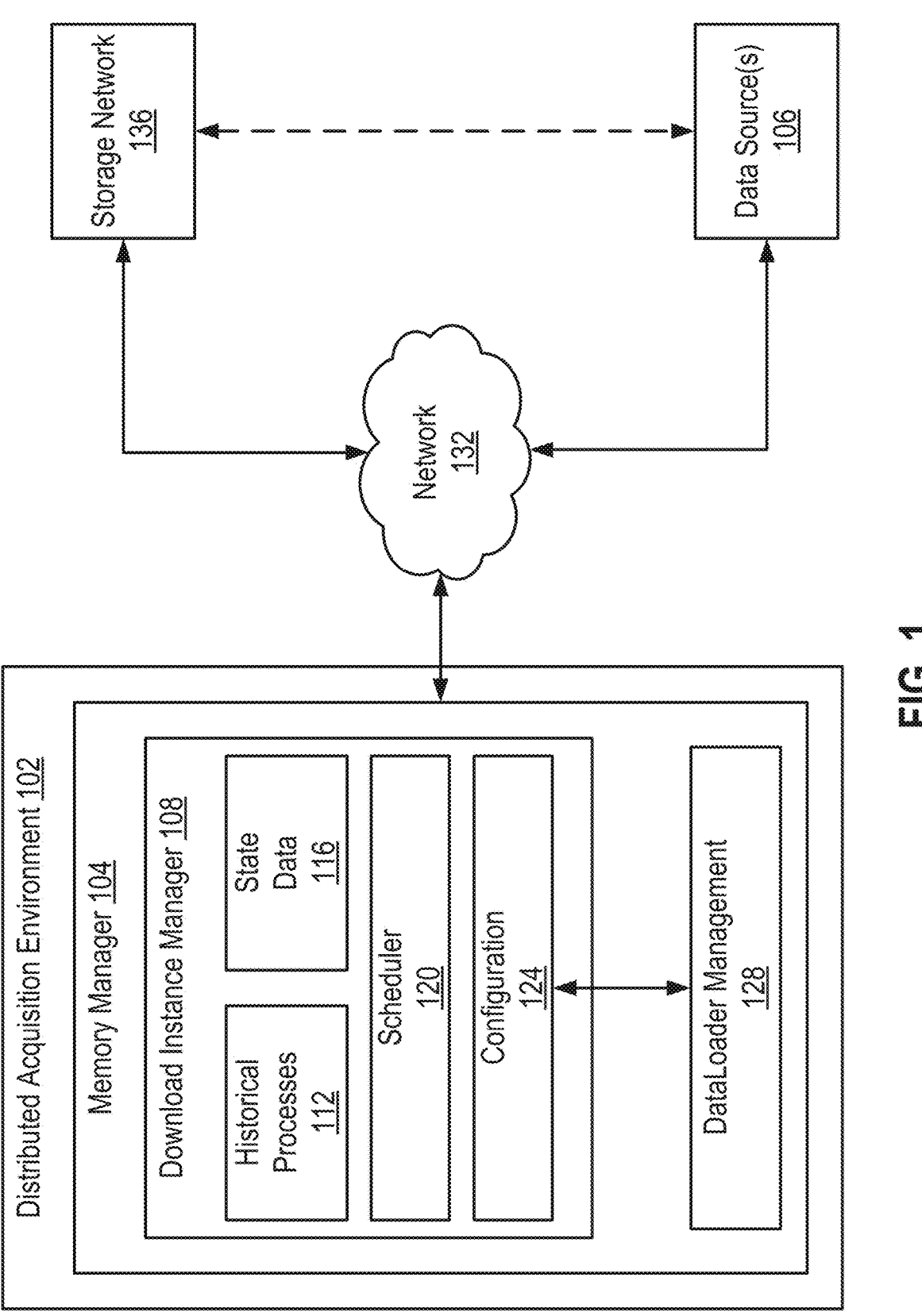
FIG. 1 illustrates a block diagram of an example distributed acquisition environment configured to download large datasets across according to aspects of the present disclosure.

Method and systems are described herein include a distributed acquisition environment configured to load dynamic datasets across cloud environments. Distributed services that rely on datasets managed within different environments may download an instance of the datasets within a local memory region (e.g., such as a cache memory or other local memory, etc.). In some instances, the distributed services may download the datasets in regular intervals to operate on a particular version of the dataset that exists over a time interval. For instance, the dataset may be updated in real time by the different environments causing the distributed services to download the datasets daily to ensure the distributed services are operating on a recent version of the datasets. The datasets may grow with the distributed services causing the distributed services to spend considerable time and resources downloading the datasets each time the datasets are downloaded. The distributed acquisition environment described herein improves resource utilization during distribution of large datasets enabling regular distribution of large datasets without impacting distributed services.

The distributed acquisition environment may operate using a large dataset of key/value pair. Each key may be a unique identifier corresponding to a location within the dataset that stores the value corresponding to the key such as a primary key, etc. Each value may include a single value, a tuple (e.g., one or more values), a data structure, a database (e.g., storing one or more key/value pairs, etc.), combinations thereof, and/or the like. The dataset may be generated and/or managed by one or more remote environments. The one or more remote environments may include one or more of servers, server farms (e.g., one or more services located within a predetermined physical proximity to each other, etc.), database, network (e.g., local or wide area network, cloud network, etc.), combinations thereof, and/or the like.

The distributed acquisition environment may download the large dataset in regular intervals to enable the distributed acquisition environment to operate using recent data. The one or more remote environments may generate an instance of a dataset for the distributed acquisition environment. For example, the one or more remote environments may generate a snapshot of the dataset at a particular time prior to distribution of the dataset to the distributed acquisition environment. The distributed acquisition environment may determine a frequency in which the dataset is to be downloaded based on the rate in which the dataset changes over time, the size of the dataset, data types stored in the dataset, services executed by the distributed acquisition environment that operate on the data, combinations thereof, and/or the like. In some examples, the distributed acquisition environment may download an instance of the dataset daily at time that may least impact the operations of the distributed acquisition environment. For instance, the distributed acquisition environment may download the dataset overnight (e.g., such as some time between 6:00 PM to 7:00 AM the next day) when the distributed acquisition environment may have more available processing resources. The distributed acquisition environment may define a dataset distribution schedule that determined a frequency in which the dataset is to be downloaded by the distributed acquisition environment and a time interval over which the download is to occur.

The download may be initiated when the distributed acquisition environment requests a current instance of the dataset. Alternatively, the download may be initiated by the one or more remote environments (e.g., according to the dataset distribution schedule, etc.). Once the download process initiates, the one or more remote environments may segment the dataset into a set of data segments. In some examples, the quantity of data segments may be fixed. For instance, the one or more remote environments may segment the dataset into five approximately equal data segments with each data segment corresponding to approximately 20% of the dataset. The distributed acquisition environment may dynamically define the fixed quantity of data segments based on historical downloads, user input, and/or the like such that the quantity of data segments may be any integer greater than or equal to 2. In other examples, the quantity of data segments may be determined based on a size of the dataset. For example, each data segment may include a predetermined quantity of data from the dataset. The one or more remote environments may increase or decrease the quantity of data segments based on a respective increase or decrease in the size of the dataset.

In some examples, the set of data segments may be structured according to a particular syntax to improve downloading of each data segment. For instance, the set of data segments may include an identifier generated according to the particular syntax. In other instances, the particular syntax may determine the structure of the data of each data segment. The particular syntax may improve downloading of the data segments by enabling the distributed acquisition environment to identify the particular data segments, identify the quantity of data segments included in the set of data segments, identify when the download is completed, combinations thereof, and/or the like.

The distributed acquisition environment calls a distribution service to initiate the transfer of the set of data segments to a temporary memory location. The distribution service may be an application, a component of an application, a microservice, a process, and/or the like. In some examples, the temporary location may be remote from both the one or more remote environments and the distributed acquisition environment. For example, the temporary memory location may be a distributed environment configured for the storage of datasets such as, but not limited to, a cloud network. In other examples, the temporary memory location may include one or more databases hosted by a device and/or network. The set of data segments may be transmitted to the temporary memory location in series, in parallel, or in a combination of in series and in parallel (e.g., some data segments being transmitted in series with other data segments and some data segments being transmitted in parallel with other data segments). In some examples, the set of data segments may be transmitted in parallel to reduce the transfer time as much as possible.

The distributed acquisition environment may include one or more services that monitor the temporary memory location for data segments. Each service of the one or more services may be an application, a component of an application, a microservice, a process, and/or the like In some examples, the distributed acquisition environment may instantiate a service of for each data segment of the set of data segments (e.g., such that distributed acquisition environment executes a same quantity of services as there are data segments in the set of data segments, which may be referred to herein as a "one-to-one" implementation). In other examples, the distributed acquisition environment may instantiate a service for two or more data segments (e.g., which may be referred to herein as a "one-to-many" implementation). In still yet other examples, the distributed acquisition environment may instantiate one service to monitor the set of data segments (e.g., which may be referred to a "single" implementation). The one or more services may check the temporary memory location by executing a call to the environment of the temporary memory location (e.g., such as, but not limited to, a remote procedure call, application programming interface or other library call, a hypertext transfer protocol (HTTP) request, etc.). Alternatively, the one or more services may check the temporary memory location by connecting to an address (e.g., uniform resource locator (URL) address, memory address, etc.), pinging a port of the temporary memory location, combinations thereof, and/or the like. The one or more services may check the temporary memory location for the presence of a data segment. In some examples, the one or more services may check the temporary memory location in regular intervals (e.g., such as, but not limited to, every 30 minutes, every 60 minutes, every 120 minutes, etc.).

If the one or more services detect the data segments in the temporary memory location, then the distributed acquisition environment assigns the one or more services to download the set of data segments. For instance, the distributed acquisition environment assigns each service of the one or more services to download the corresponding data segment of the set of data segments detected by that service at the temporary memory location. Each service may download a corresponding data segment of the set of data segments allowing the one or more services to download the set of data segments in parallel. In some examples, the distributed acquisition environment may assign a service as soon as the service detects a data segment. In other examples, the distributed acquisition environment may wait until each data segment of the set of data segments is detected at the temporary memory location.

In a one-to-one implementation (where a service is instantiated for each data segment), the distributed acquisition environment assigns each service to download a particular data segment to a temporary location of the distributed acquisition environment.

Each service of the one or more services may be assigned to download a particular data segment to a temporary location of the distributed acquisition environment. In some examples, the distributed acquisition environment may assign a service to a data segment by passing the particular syntax corresponding to the data segment to the service. For example, in an implementation where the particular syntax refers to a particular identifier, the particular identifier may be passed to the assigned service to enable the assigned services to identify and download the correct data segment. In other implementations, such as where the particular syntax corresponds to a structure of the data segment, the distributed acquisition environment may provide information to the assigned service indicating the structure of the data segment. The distributed acquisition environment may include metadata that tracks the assignment of each service to each data segment of the set of data segments. The metadata may define a record of the download that may be stored for later data verification and auditing purposes. In some instances, the metadata may be accessible by one or more managerial processes that monitor and/or control the one or more services, monitor and/or control the download process, perform various data verification algorithms on the downloaded data, combinations thereof, and/or the like.

As each data segment is downloaded to the temporary location of the distributed acquisition environment, the distributed acquisition environment begins loading the data of each data segment into working memory. For example, since each data segment may store key/value pairs, the distributed acquisition environment begins loading the key/value pairs from the temporary location of the distributed acquisition environment to a cache tile or other working memory location (e.g., a memory location configured to be updated regularly each time the set of data segments are downloaded, etc.). Since each data segment is already downloaded into temporary memory of the distributed acquisition environment, the distributed acquisition environment performs read operations which are comparatively faster than read and write operations that occur during normal data transfer operations.

Each service may be configured to modify a status of the data segment to mark the downloading process. For example, once a data segment is successfully downloaded, the corresponding particular syntax of the file may be modified (e.g., such as restructured, provided a new identifier, etc.) to indicate the successful downloading of the data segment. The status of the data segment may be modified at the temporary memory location, at the temporary location of the distributed acquisition environment, and/or at the working memory location of the distributed acquisition environment. In some examples, the one or more services may modify the particular syntax to indicate other statuses of the data segment such as, but not limited to, download interrupted, download failure, corrupted data, memory leaks, memory errors due to locks or semaphores, network connectivity errors (e.g., such as a download taking longer than anticipated, etc.), combinations thereof, and/or the like.

The distributed acquisition environment may determine that the download is completed once the status of each data segment of the set of data segments has been modified to indicate a successful download.

The distribution of the set of data segments to the distributed acquisition environment via the temporary memory location using one or more parallel services may reduce the overall time needed to download the set of data segments to the distributed acquisition environment to a fraction of the download time.

In an illustrative examine, a computing device may receive a request to load a dataset into a first network (e.g., a distributed acquisition environment, the computing device, one or more devices associated with the distributed acquisition environment, etc.). The dataset may be stored by a remote environment (e.g., one or more devices, one or more networks, etc.). In some instances, the computing device may be the first network or a component thereof, etc. In other instances, the computing device may be a remote environment from the first network and/or a component thereof.

The dataset may include a key/value pairs usable by the first network. For example, a service or process of the first network may operate on the key/value pairs, etc. Since the service or process of the first network may operate more efficiently on an instance of the dataset that closely mirrors the dataset of the remote environment, the first network may load an instance of the dataset (e.g., a snapshot of the dataset at a particular time, etc.).

In some examples, the request may be received from a scheduler service of the computing device. For example, the scheduler service may periodically generate a request to load the dataset in regular intervals such as, but not limited to, once a day, every 6 hours, etc. In other instances, the scheduler service may generate the request to load the dataset upon detection of an event such as a communication from the remote environment, an indication that the dataset stored by the remote environment has changed (e.g., key/value pairs have been added, removed, or modified, etc.), a communication from device associated with the first network (e.g., from, for example, a user, a service, etc.), combinations thereof, and/or the like. In still yet other instances, the request may be transmitted by the first network and received by the remote environment.

The computing device facilitates the partitioning of the dataset into one or more data segments forming a set of data segments that correspond to the dataset. Each data segment of the one or more data segments may be associated with a data loader of one or more data loaders of the first network. A data loader is a service (e.g., application, process, microservice, etc.) of the first network that manages the distribution of one or more data segments. When the process of loading the dataset into the first network initiates, the first network and/or the remote environment that is hosting the dataset determines a degree in which to partition the dataset. In some examples, the first network and/or the remote environment partitions the dataset based on the quantity of key/value pairs included in the dataset. In other examples, the first network and/or the remote environment partitions the dataset based on a memory size of the dataset. In still yet other examples, the first network and/or the remote environment partitions the dataset based on one or more other factors such as, but not limited to, a distribution of data types, a timestamp associated with each key/value pair (e.g., indicating when the key/value pairs were added to the dataset, a timestamp associated with when the dataset was defined, bandwidth of the first network and/or remote environment, combinations thereof, and/or the like. For example, the first network and/or remote environment may partition the dataset into five data segments.

The first network may instantiate the one or more data loaders that will manage the downloading of one or more data segments of the dataset. In some examples, the first network may instantiate a data loader for each data segment. In other examples, the first network may instantiate a data loader for two or more data segments. In still yet other instances, the first network may instantiate one data loader, which will manage the downloading of the data segments of the dataset. Each data loader may be an identical instance of the same service. Alternatively, each data loader may be different based on a corresponding data segment to be downloaded by that data loader. For example, each data loader may be instantiated according to a different configuration based on the corresponding data segment to be downloaded by that data loader such as the structure or syntax of the data segment.

The computing device may facilitate the transfer of the set of data segments to a temporary location. In some examples, the computing device may transmit a request to the remote environment hosting the set of data segments to cause the remote environment to transmit the one or more data segments to the temporary location. In other examples, the first network may transmit a request to the temporary location causing the remote environment to download the set of data segments. In those examples, the first network may include an identification of the set of data segments and/or individual data segments to the temporary location.

The temporary location may include memory for storing data from the remote environment (and optionally the first network). The temporary location may include one or more computing devices, one or more servers, one or more databases, combinations thereof, and/or the like. In some instances, the temporary location may be a distributed environment such as a cloud network (e.g., a second network), or the like. The temporary location may be remote from both the remote environment and the first network, but connected to the remote environment and the first network via a network connection (e.g., such as a direct connection, a proxy connection, an Internet connection, etc.)

The computing device may then facilitate downloading of the set of data segments from the temporary location to the first network by the one or more data loaders. The computing device may assign a particular data segment to each data loader (e.g., based on an identifier of the data segment, a particular syntax of the data segment, a size of the data segment, combinations thereof, and/or the like). The one or more data loaders may download the data segments in parallel such that each data loader begins downloading a data segment at approximately the same time. Alternatively, the data loaders may download the data segments partially in parallel (e.g., in which some of the data loaders begin downloading data segments at different times) or in series (e.g., in which one data segment is downloaded at a time).

When a data loader completes downloading of a data segment, the data loader may modify the data segment to indicate that the download is complete. The data loader may modify the downloaded data segment and/or the instance of the data segment stored in the temporary location. Examples of modifications to the data segment include, but are not limited to, modifying an identifier of the data segment (e.g., such as a file name, etc.), modifying an entry of the data segment (e.g., such as a value corresponding to a particular key, a flag, and/or the like), adding or removing a key and/or key/value pair, combinations thereof, and/or the like. In some instances, upon detecting that a data segment has been modified, the first network may cause the instance of that data segment to be removed (e.g., deleted, etc.) from the temporary location.

In some examples, each data loader may verify an integrity of the corresponding data segment downloaded by that data loader before modifying the corresponding data segment. Each data loader may execute one or more verification techniques. In some instances, each data loader may execute the same one or more verification techniques. In other instances, each data loader may execute different one or more verification techniques (e.g., such as the same verification techniques in a different order or different verification techniques, etc.). Example of verification techniques include, but are not limited to, checksums, cyclic redundancy checks, redundancies (e.g., comparing portions of a data segment to duplicate portion of the dataset, etc.), metadata, combinations thereof, and/or the like. For instance, a checksum (e.g., a hash value derived from a data segment) may be downloaded with a data segment. The data loader may derive a corresponding checksum using the downloaded data segment and compare it to the checksum included with the data segment. In some instances, each data segment may include a portion of other data segments such that upon downloading a data segment the corresponding data loader may request the duplicate data segment from another data loader and compare them to verify the integrity of the download.

When the computing device detects that each data segment has been modified, the first network may reintegrate the set of data segments into the dataset. The first network may integrate the set of data segments into the dataset using the modification to the data segments to determine an order of the set of data segments that make the dataset. Upon completion of the download, an instance of the dataset is present at the remote environment and the first network. The set of data segments may be removed from the temporary location enabling the temporary location to be usable for downloading the next instance of the dataset.

FIG. 1 illustrates a block diagram of an example distributed acquisition environment configured to download large datasets across according to aspects of the present disclosure. Distributed acquisition environment 102 may include a secure environment that executes processes involving large datasets. The datasets may be stored and/or managed by one or more data source(s) 106. Distributed acquisition environment 102 may download a snapshot of the large dataset (e.g., an instance of the large dataset existing at a particular time instant, etc.) to execute the process of distributed acquisition environment 102. Since the data of the one or more data source(s) 106 may change over time, distributed acquisition environment 102 may download the large dataset regularly to allow for distributed acquisition environment 102 to operate using a version of the large dataset that closely matches the version of the data stored by stored and/or managed by one or more data source(s) 106.

Data source(s) 106 may include one or more environments (e.g., one or more computing devices, servers, databases, networks, virtual environments, combinations thereof, and/or the like) that manage various data. In some examples, the data may be stored as key/value pairs, where each key corresponds to a location within the dataset or memory region in which a corresponding value is stored. Keys may be unique within the dataset. A value may correspond to a discrete data entry (e.g., a variable, numerical value, a file, a portion of a file, one or more data types, structured data, unstructured data, etc.), a tuple (e.g., an ordered set of discrete data entries, a set of discrete data entries (e.g., ordered or unordered, etc.), combinations thereof, and/or the like.

Distributed acquisition environment 102 may memory manager 104 that manages one or more memory units (e.g., one or more discrete memory units including volatile and/or non-volatile memories). Examples of memory units include, but are not limited to, hard disk drives or other magnetic storage devices, optical storage devices, solid-state storage devices (e.g., flash memory, etc.), random-access memory, cache (e.g., L1, L2, L3, etc.), combinations thereof, and/or the like. The one or more memory units may be components of a single device (e.g., computing device, server, etc.), a local environment (e.g., a server farm, local or wide area network, etc.), distributed environment (e.g., cloud-based environment, etc.), combinations, thereof, and/or the like.

Memory manager 104 may include download instance manager 108 that manages downloading of snapshots of the dataset from data source(s) 106. Download instance manager 108 includes historical processes 112, state data 116, scheduler 120, and configuration 124. Historical processes 112 stores data associated with previous downloads of snapshots of the dataset from data source(s) 106 including, for each download, a quantity of data downloaded, a time-stamp of when the download started, a duration of the download, bandwidth metrics (e.g., average amount of data downloaded per second, peak amount of data downloaded per second, timestamps corresponding to peak amount of data downloaded per second, minimum data downloaded per second, missed or dropped packets, missed or dropped data segments, combinations thereof, and/or the like), an identification of devices downloaded from, an identification where the dataset was downloaded (e.g., identification of physical memory used), events (e.g., errors, faults, exceptions, interrupts, and/or any other events impacting the download, etc.), combinations thereof, and/or the like. Download instance manager 108 may use historical processes 112 when configuring scheduler 120 and/or configuration 124 for a subsequent download. For example, download instance manager 108 may receive an indication of a size of a dataset to be downloaded from data source(s) 106 and use historical processes 112 to configure scheduler 120 as to when to initiate the download and configure configuration 124 as to how to download the dataset.

State data 116 stores a state of a current download of a dataset from data source(s) 106. In particular, state data 116 monitors DataLoader Management 128 (e.g., which manages data loaders that perform the download), storage network 136 (e.g., a staging ground for the download), data source(s) 106, current bandwidth conditions, download progress, the one or more memory units, combinations thereof, and/or the like. State data 116 may transmit communications to memory manager 104 and/or other components of distributed acquisition environment 102 reporting download state, bandwidth conditions, errors, and/or the like to enable download instance manager 108 to dynamically adjust the download process. For instances, download memory manager 104 may receive a write error from state data 116 indicating a memory unit has failed and automatically redirect the data to a different memory unit.

Scheduler 120 schedules the initiation of the download. Since the dataset may be large, scheduler 120 may schedule the download to occur late at night or early in the morning to make sure the download is completed before other processes of distributed acquisition environment 102 begin access the dataset. Scheduler may define when the download is to begin and a download frequency (e.g., how often a new snapshot of the dataset is to be downloaded, etc.). In some examples, scheduler 120 may schedule the download at regular intervals (e.g., every 24 hours, etc.). In other instances, scheduler 120 may schedule the download based on changes in the dataset. For example, since distributed acquisition environment 102 may download a snapshot of the dataset regularly, scheduler 120 may schedule a subsequent download of the dataset when once a change in dataset is detected. This prevents distributed acquisition environment 102 from downloading an identical instance of the dataset that is already stored in memory of distributed acquisition environment 102.

Configuration 124 includes parameters that drive the download process such as, but not limited to, a quantity of data loaders to instantiate, an indication of what portion of the dataset each instantiated data loader is to download, a maximum download rate (e.g., if a download rate that is less than the available bandwidth is requested, etc.), a memory location to download the dataset to, a start time (e.g., received from scheduler 120, etc.), combinations thereof, and/or the like. Configuration 124 may define a configuration for each download or a single configuration for one or more downloads.

A download may be initiated according to the schedule defined by scheduler 120. Distributed acquisition environment 102 may transmit a communication to data source(s) 106 requesting to download of a snapshot of a dataset. In some examples, data source(s) 106 may include one or more independent environments. In those instances, distributed acquisition environment 102 may transmit a communication to a primary data source of data source(s) 106. The primary data source may aggregate the data from each of data source(s) 106 to a central location for downloading by distributed acquisition environment 102. Alternatively, the primary data source may facilitate downloading of the snapshot of the dataset by identify the location of the portions of the dataset stored by each environment of data source(s) 106. Alternately, distributed acquisition environment 102 may transmit a communication to each data source of data source(s) to download the portion of the dataset stored by that data source. In other instances, data source(s) 106 may include one or more environments managed by a same entity or associated with a same entity. In those instances, distributed acquisition environment 102 may transmit the communication to any data source of data source(s) 106 and/or the entity.

Data source(s) 106 may segment the dataset into one or more data segments. In some instances, data source(s) 106 may segment the dataset into approximately equal sized data segments. In other instances, data source(s) 106 may segment the dataset into varying sized data segments (e.g., based on a quantity of data of the dataset, one or more data types, a size of the dataset, a structure of the dataset and/or each data segment, etc.). Data source(s) may transmit a communication via network 132 to distributed acquisition environment 102 that identifies the one or more data segments. Alternatively, the communication may include an identification of a quantity of data segments because the process for segmenting the dataset e.g., such as a naming convention, data structures, etc.) may be known to distributed acquisition environment 102.

Data source(s) 106 then transfers the one or more data segments to storage network 136. Storage network 136 may be distributed environment (e.g., such as a cloud network, etc.) configured to store large quantities of data. Data source(s) 106 may transfer the one or more data segments via network 132. Alternatively, data source(s) 106 may transfer the one or more data segments via a direct connection (if present).

Upon receiving the communication from data source(s) 106 corresponding to the identification of the one or more data segments (or the quantity of data segments), distributed acquisition environment 102 may cause DataLoader Management 128 to instantiate one or more data loaders. In some examples, DataLoader Management 128 may instantiate a same quantity of data loaders as the quantity of data segments (e.g., a one-to-one implementation of data loaders to data segments). In other examples, DataLoader Management 128 may instantiate one or more data loaders for every two or more data segments (e.g., a one-to-many implementation of data loaders to data segments).

Each data loader may be configured to download a data segment of the one or more data segments from storage network 136. This enables distributed acquisition environment 102 to download at least a portion of the one or more data segments in parallel reducing an overall time of the download. Each data loader may rename the data segment when downloading of the data segment completes. Once each data segment has been renamed, distributed acquisition environment 102 can recombine the one or more data segments into the dataset. In some instances, distributed acquisition environment 102 may also transmit a communication to storage network 136 and/or data source(s) 106 informing storage network 136 and/or data source(s) 106 that the download has completed. The communication may cause storage network 136 to delete the one or more data segments stored there in preparation for the next time the dataset is to be downloaded.

State data 116 may store data associated with the download (e.g., such as any of the aforementioned data) as a new record within historical processes 112. Distributed acquisition environment 102 may use the new record to further improve the downloading of the dataset (e.g., such as, but not limited to, scheduler 120, configuration 124, the segmentation of the dataset into data segments, the quantity of data segments defined during segmentation, the structure of the data segments, quantity of data loaders instantiated for the download, storage network 136, combinations thereof, and/or the like).

Figure 2:
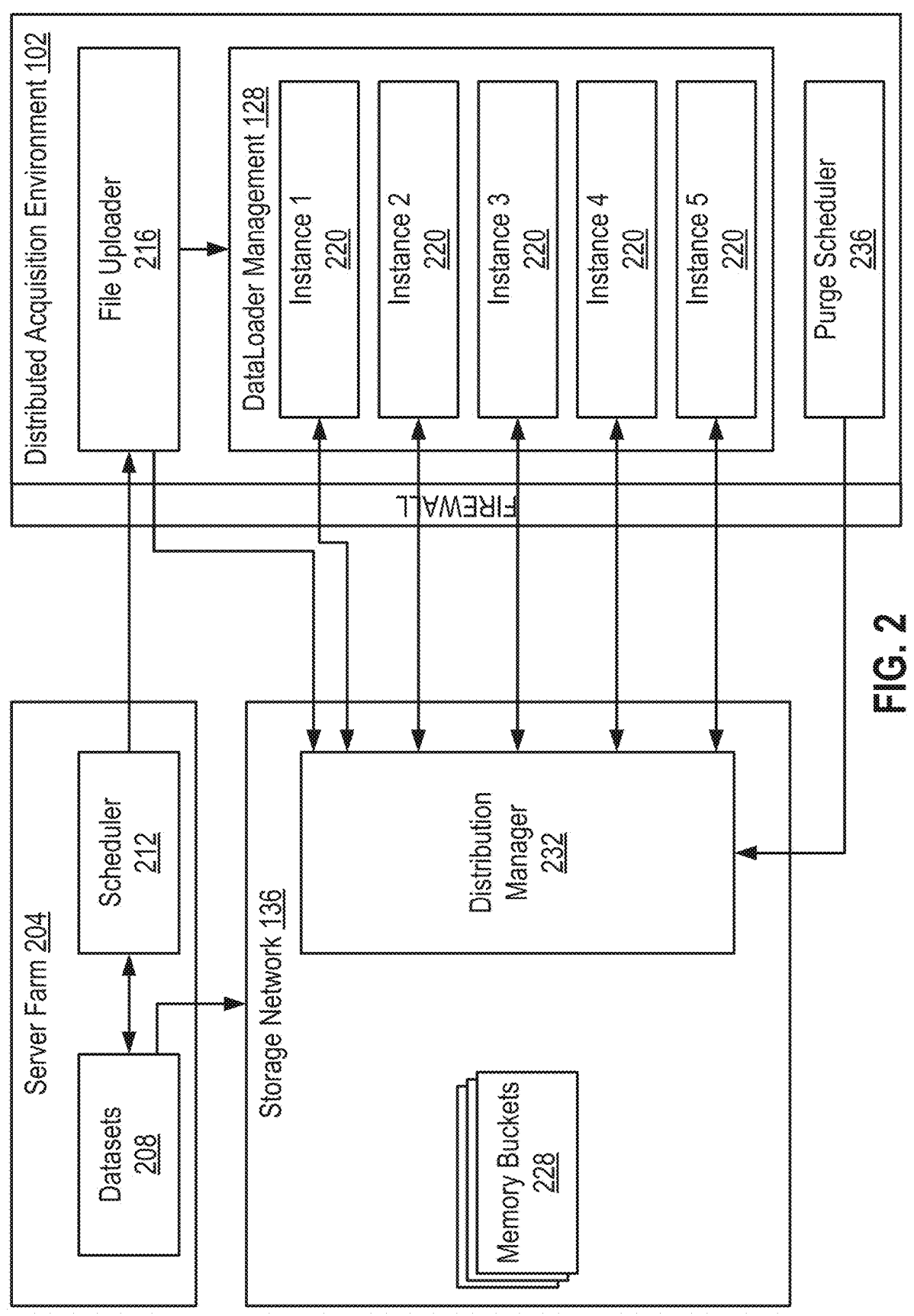
FIG. 2 illustrate a block diagram of an example transfer of a large dataset across one or more environments according to aspects of the present disclosure.

FIG. 2 illustrate a block diagram of an example transfer of a large dataset across one or more environments according to aspects of the present disclosure. Distributed acquisition environment 102 may download a large dataset stored and/or managed by server farm 204. Server farm 204 may include one or more computing devices, servers, databases, etc. Server farm 204 may include one or more datasets 208 and scheduler 212 that manages distribution of the datasets to distributed acquisition environment 102. Scheduler 212 determines when to initiate a download. In some instances, the download is prearranged (e.g., both server farm 204 and distributed acquisition environment 102 start the download at the same time). In other instances, scheduler 212 initiates the download by transmitting a communication to file uploader 216 of distributed acquisition environment 102. In other instances, scheduler 212 initiates the download upon receiving a communication from distributed acquisition environment 102.

When the download initiates, server farm 204 segments the dataset to be downloaded into one or more data segments. In some examples, server farm 204 segments the dataset into a predetermined quantity of data segments (e.g., 3, 5, 10, n, where n is any integer greater than zero), Scheduler 212 transmits a communication to file uploader identifying the dataset and/or the one or more data segments. Server farm transmits the one or more data segments to storage network 136 136. Storage network 136 may be a distributed storage environment (e.g., such as a cloud network, etc.). Storage network 136 may store the one or more data segments in memory buckets 228 (e.g., a region of memory, etc.). Distribution manager 232 may manage the downloading of the one or more data segments to distributed acquisition environment 102.

Upon receiving the communication from scheduler 212, file uploader 216 may provide an identification of the dataset and/or the one or more data segments to DataLoader Management 128. File uploader 216 may also transmit a communication to distribution manager 232 of storage network 136 identifying the one or more data segments to be downloaded. DataLoader Management 128 may instantiate data loaders that implement the download. In some examples, DataLoader Management 128 may instantiate a data loader for each data segment to be downloaded. For instance, if server farm 204 segments the dataset into 5 data segments, then DataLoader Management 128 instantiates 5 data loaders (e.g., instance 1, instance 2, instance 3, instance 4, instance 5, etc. each referred to as instance 220). Each data loader may be configured to download a particular data segment (e.g., in a one-to-one implementation) or two or more data segments (e.g., in a one-to-many implementation). Each data loader may be an identification instance of a data loader. Alternatively, DataLoader Management 128 may define each instance of a data loader differently based on the particular data segment to be downloaded by that data loader.

Each instance 220 of the data loader may connect to distribution manager 232 of storage network 136, identify the data segment to be downloaded by that instance 220 of the data loader, and begin downloading the instance to a temporary location within distributed acquisition environment 102. When an instance 220 of the data loader finishes downloading a data segment, the instance 220 of the data loader modifies the data segment (e.g., at storage network 136 or at the temporary location within distributed acquisition environment 102). For example, the instance 220 of the data loader may change a file name of the data segment, the structure of the data segment, metadata of the data segment, a flag associated with the data segment, etc.). Modifying the data segment signals to the distributed acquisition environment 102 that the instance 220 of the data loader completed the download.

Once each data segment has been modified (signaling that the download has been completed for each data segment), the distributed acquisition environment 102 may combine the one or more data segments into a dataset and move the downloaded dataset to a different location (e.g., persistent memory, etc.). Distributed acquisition environment 102 may then transmit a communication to distribution manager 232 causing storage network 136 to delete the one or more data segments stored in memory buckets 228.

Since a snapshot of the dataset is downloaded in regular intervals, distributed acquisition environment 102 may use a timer to determine when to delete the downloaded instance of the dataset in preparation for downloading the next snapshot of the dataset. Once the timer terminates (e.g., reaches a threshold time, reaches zero, etc.), distributed acquisition environment 102 may delete the dataset. In some instances, the timer may be configured to terminate shortly before the next snapshot of the dataset is to be downloaded. In other instances, the timer may be configured to terminate once processes of distributed acquisition environment 102 that operate on the dataset are configured to terminate (e.g., such as at the end of a business day, midnight, etc.) such that the dataset is no longer in use.

Figure 3:
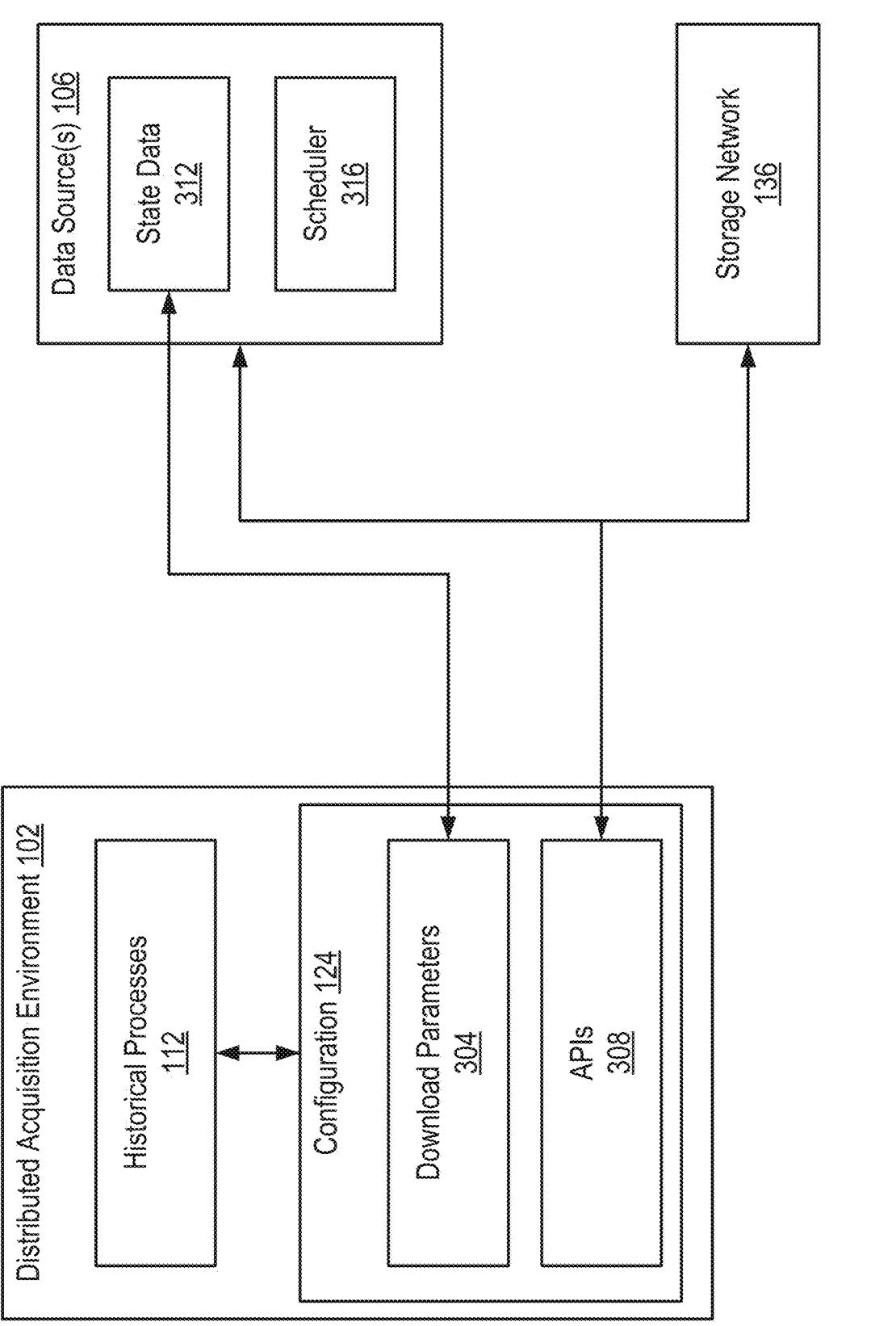
FIG. 3 illustrates a block diagram of an example configuration of a distributed acquisition environment according to aspects of the present disclosure.

FIG. 3 illustrates a block diagram of an example configuration of a distributed acquisition environment according to aspects of the present disclosure. Distributed acquisition environment 102 may configure a regular download of a large dataset from data source(s) 106. Distributed acquisition environment 102 may include historical processes 122 to define a configuration (e.g., by configuration 124) for individual downloads, a set of downloads, and/or every download of the dataset.

Historical processes 112 stores a record associated with previous downloads of snapshots of the dataset from data source(s) 106. The record of each download may include a set of features characterizing the download. The features may include, but are not limited to, a quantity of data downloaded (e.g., a quantity of key/value pairs, a memory size, etc.), a timestamp of when the download started, a duration of the download, bandwidth metrics (e.g., average amount of data downloaded per second, peak amount of data downloaded per second, timestamps corresponding to peak amount of data downloaded per second, minimum data downloaded per second, missed or dropped packets, missed or dropped data segments, combinations thereof, and/or the like), an identification of devices downloaded from, an identification where the dataset was downloaded (e.g., identification of physical memory used), events (e.g., errors, faults, exceptions, interrupts, and/or any other events impacting the download, etc.), combinations thereof, and/or the like.

Distributed acquisition environment 102 may use one or more features from historical processes 112 to define a configuration for the downloading of a dataset from data source(s) 106. In some examples, distributed acquisition environment 102 may weight recent features (e.g., features from the previous download, features from downloads completed in the last 30 days, etc.) over other features when defining the configuration. In other examples, distributed acquisition environment 102 may weight features based on an impact on the download. For example, distributed acquisition environment 102 may include a feature selection process configured to evaluate particular features relative to other features (e.g., identifying dependencies between features, etc.) and evaluate an impact particular features have on the download process. The feature selection process may use simulated annealing, a genetic algorithm, forward selection, backward elimination, one or more machine-learning models (e.g., such as logistic regression, Hidden Markov models, random forest, k-nearest neighbors, deep learning, neural networks, support vector machines, gradient boosting models, Naïve Bayes, kernel estimation models, combinations thereof, and/or the like), combinations thereof, and/or the like to select features to define a configuration for a particular download. The feature selection process may define weights based on an impact of a feature on the download (e.g., increasing a weight for features with a positive impact on the download such as reducing download time or reducing error rates, and reducing a weight for features with a negative impact on the download such as increasing resource utilization or reducing a download rate, etc.). After the particular download, the particular download may be compared to previous downloads as a way of evaluating the configuration of the particular download against previous downloads. The distributed acquisition environment 102 may apply feedback to the feature selection process to remove features that may negatively impact (or have no impact) on the configuration or the particular download, add new features for subsequent downloads, weight features (to improve feature selection, etc.), combinations thereof, and/or the like.

The features may be passed to configuration 124, which defines a configuration for a download. Configuration 124 defines parameters from the features that control aspects of the download process. The parameters can include, but are not limited to, a quantity of data loaders to instantiate, an indication of what portion of the dataset each instantiated data loader is to download, a maximum download rate (e.g., if a download rate that is less than the available bandwidth is requested, etc.), an identification of a location of the dataset and/or data segments (e.g., memory addresses, network addresses, and/or the like), information associated with devices process aspects of the download such as data source(s) 106, storage network 136, etc.), a memory location to download the dataset to, a start time (e.g., received from scheduler 120, etc.), combinations thereof, and/or the like.

Configuration 124 stores the parameters in download parameters 304 for use defining subsequent configurations. For example, configuration 124 may define a configuration using previously defined parameters stored in download parameters 304, define a configuration some previously defined parameters stored in download parameters 304 and some newly defined parameters (as previously described), and/or define a configuration using newly defined parameters. Download parameters 304 may also store parameters derived during a download process based on state data of distributed acquisition environment 102 (e.g., state data 116 of FIG. 1, etc.), and state data 312 of data source(s) 106. State data 312 stores metadata and state information associated with the dataset being downloaded including, but not limited to, a quantity of data segments defined from a dataset for a given download, a quantity of key/value pairs in the dataset being downloaded, a quantity of key/value pairs in each data segment, an identifier of a data segment, error verification information associated with the dataset and/or each data segment (checksums, cyclic redundancy checks (CRC), redundancies, etc.), memory address location of the dataset and/or data segment, data structure information (e.g., such as syntax, structural information, and/or the like associated with the dataset and/or each data segment), combinations thereof, and/or the like. Configuration 124 may use state data 312 to define additional parameters (to be stored in download parameters 304) when defining a configuration for a download.

Once a configuration is defined, configuration access APIs 308 to implement the configuration. The configuration includes some parameters that can be implemented by distributed acquisition environment 102. Distributed acquisition environment 102 may implement other parameters of the configuration using APIs 308 to modify aspects of data source(s) 106 and storage network 136 and/or to communicate with data source(s) 106 and storage network 136 (e.g., such as, but not limited to, request action by data source(s) 106 and/or storage network 136, request inaction by data source(s) 106 and/or storage network 136, request information from data source(s) 106 and/or storage network 136, etc.). API's may include one or more libraries associated with each data source of data source(s) 106 and storage network 136. The libraries may be utilized to modify operations of data source(s) 106 and/or storage network 136 to implement a parameter by, for example, executing function calls that implement a parameter, generating a request for data source(s) 106 and/or storage network 136 to implement the parameter, etc.

For example, parameters of a configuration may define a download start time and a quantity of data segments that the dataset should be divided into. Distributed acquisition environment 102 uses APIs 308 to transmit the parameters to data source(s) 106. For instance, distributed acquisition environment 102 may execute functions of APIs 308 that modify a configuration of data source(s) 106 or, alternatively, distributed acquisition environment 102 may execute functions of APIs 308 that transmit the parameters to data source(s) 106. Implementing the parameters using APIs 308 may may configure scheduler 316 to cause scheduler 316 to initiate the download by dividing the dataset into a set of data segments according to the parameters.

For another example, a parameter may define a minimum download rate for a data segment. Distributed acquisition environment 102 may access APIs to modify temp storage network to enable downloading a data segment at or above the minimum download rate. In some examples, APIs may enable distributed acquisition environment 102 to communicate with data source(s) 106 and/or storage network 136 by translating communications into a native protocol, syntax, structure, and/or format that is parsable by data source (s) 106. APIs and/or by storage network 136. Similarly, API's may be used to translate communications received by data source(s) 106 and/or storage network 136 into a native protocol, syntax, structure, and/or format that is parsable by distributed acquisition environment.

FIG. 4 illustrates a flowchart of an example process for transferring a dataset via one or more environments according to aspects of the present disclosure. At block 404, a computing device receives a request to load a dataset into a first network (e.g., a distributed acquisition environment of FIG. 1, etc. In some examples, the computing device may be a component of the first network (e.g., such as a terminal, server, etc.) or a device associated with the first network. In other examples, the computing device may be associated with a remote environment (e.g., an environment that is remote from the first network) that stores the dataset. The remote environment may be, but is not limited to, a server, database, the computing device, a network (e.g., such as a local area network, wide area network, cloud network, etc.), combinations thereof, and/or the like. As an example, the computing device may be data source(s) 106 of FIG. 1 and/or a component thereof, server farm 204 of FIG. 2 and/or a component thereof, and/or the like.

The dataset may be stored by and/or managed by the remote environment. The dataset may include any data type (e.g., such as, but not limited to, files, objects, structured data, unstructured data, alphanumeric data, video data, audio data, combinations thereof, and/or the like). In some examples, the dataset may include key/value pairs where the key is usable to identify a location within the dataset in which the corresponding value is stored and the value may correspond to the data. The first network may execute one or more services that operate using the key/value pairs of the dataset. The dataset may be updated by the remote environment in real time. As a result, the first network may download a snapshot of the dataset (e.g., an instance of the dataset existing at particular time instant) to enable the one or more services of the first network to operate using a dataset that closely mirrors the current version of the dataset of the remote environment.

In some examples, the request to load the dataset may be received from a scheduler service of the computing device. For example, the scheduler service may generate a request to load the dataset in regular intervals such as, but not limited to, once a day, every 6 hours, etc. In other instances, the scheduler service may generate the request to load the dataset upon detection of an event such as, but not limited to, a communication from the remote environment, an indication that the dataset stored by the remote environment has changed (e.g., key/value pairs have been added, removed, or modified, etc.), a communication from device associated with the first network (e.g., from, for example, a user, a service, etc.), combinations thereof, and/or the like.

The request may be transmitted by the first network or the remote environment. For instance, in implementations where the computing device is a component of the first network, the request to load the dataset may be generated by the first network (e.g., a scheduler service of the first network, an administrator of the first network, one or more services operating on the dataset of the first network, one or more other services of the first network, an event of the first network, etc.) or by the remote environment (e.g., a scheduler service of the remote environment, an administrator of the remote environment, one or more other services of the remote environment, an event of the remote environment, etc.). In implementations where the computing device is a component of the remote environment, the request to load the dataset may be generated by the first network (e.g., a scheduler service of the first network, an administrator of the first network, one or more services operating on the dataset of the first network, one or more other services of the first network, an event of the first network, etc.) or by the remote environment (e.g., a scheduler service of the remote environment, an administrator of the remote environment, one or more other services of the remote environment, an event of the remote environment, etc.).

At block 408, the computing device divides the dataset into one or more data segments (e.g., where the one or more data segments are collectively referred to as a set of data segments). Each data segment of the one or more data segments may be associated with a data loader of one or more data loaders of the first network. A data loader is a service (e.g., application, process, microservice, etc.) of the first network that manages downloading of one or more data segments. In some examples, when the process of loading the dataset into the first network initiates (at block 404), the computing device determines a quantity of data segments that the dataset will be partitioned into. The computing device may transmit a communication to the remote environment causing the remote environment to segment the dataset into the determined quantity of data segments. In other examples, the remote environment determines a quantity of data segments that the dataset will be partitioned into. The remote environment may transmit a communication to the computing device and/or the first network identifying the quantity of data segments. The quantity of data segments may be determined based on one or more factors of the dataset such as, but not limited to, a quantity of key/value pairs included in the dataset, a memory size of the dataset, a distribution of data types of the dataset, a timestamp associated with each key/value pair (e.g., indicating when the key/value pairs were added to the dataset), a timestamp associated with when the snapshot of the dataset was defined, a bandwidth of the first network and/or remote environment, combinations thereof, and/or the like.

In still yet other examples, the quantity of data segments may be predetermined such as, 3, 5, 10, n where n is any integer greater than 1).

The first network may instantiate the one or more data loaders that will manage the downloading of one or more data segments of the dataset. In some examples, the first network may instantiate a data loader for each data segment. In other examples, the first network may instantiate a data loader for two or more data segments. In still yet other instances, the first network may instantiate one data loader, which will manage the downloading of the set of data segments. Each data loader may be an identical instance of the same service. Alternatively, each data loader may be different based on a corresponding data segment to be downloaded by that data loader. For example, each data loader may be instantiated according to a different configuration based on characteristics of the corresponding data segment to be downloaded by that data loader (e.g., such as the structure or syntax of the data segment, etc.).

At block 412, the computing device may facilitate the transfer of the set of data segments to a temporary location. In some examples, the temporary location may be a component the remote environment. In other examples, the remote environment may be a remote from the temporary location (and the first network). the remote environment may be connected to the temporary location via a network connection (e.g., such as a direct connection, a proxy connection, an Internet connection, etc.). The temporary location may include memory for storing data from the remote environment (and optionally the first network). The temporary location may include one or more computing devices, one or more servers, one or more databases, combinations thereof, and/or the like. In some instances, the temporary location may be a distributed environment such as a cloud network (e.g., referred to as a second network), or the like. The temporary location may be remote from both the remote environment and the first network, but connected to the remote environment and the first network via a network connection.

In implementations where the computing device is a component of the first network, the computing device may facilitate the transfer of the set of data segments by transmitting a communication to the remote environment, transmitting a communication to the temporary location (e.g., a device thereof, etc.), initiating the loading of the dataset (e.g., upon execution of block 404, etc.), and/or the like. In implementations where the computing device is a component of the remote environment, the computing device may facilitate the transfer of the set of data segments by transmitting the set of data segments to the temporary location, causing other devices of the remote environment to transmit the set of data segments to the temporary location, and/or the like.

At block 416, the computing device may then facilitate downloading of the set of data segments from the temporary location to the first network by the one or more data loaders. The computing device (or the first network) may assign a particular data segment to each data loader (e.g., based on an identifier of the data segment, a particular syntax of the data segment, a size of the data segment, combinations thereof, and/or the like). The one or more data loaders may download the data segments in parallel such that each data loader begins downloading a data segment at approximately the same time. Alternatively, the data loaders may download the data segments partially in parallel (e.g., in which some of the data loaders begin downloading data segments at different times) or in series (e.g., in which one data segment is downloaded at a time).

When a data loader completes downloading of a data segment from the temporary location, the data loader may modify the data segment to indicate that the download is complete. The data loader may modify the downloaded data segment and/or the instance of the data segment stored in the temporary location. Examples of modifications to the data segment include, but are not limited to, modifying an identifier of the data segment (e.g., such as a file name, etc.), modifying an entry of the data segment (e.g., such as a value corresponding to a particular key, a flag, and/or the like), adding or removing a key and/or key/value pair, combinations thereof, and/or the like.

In some examples, each data loader may verify an integrity of the corresponding data segment downloaded by that data loader before modifying the corresponding data segment. Each data loader may execute one or more verification techniques. In some instances, each data loader may execute the same one or more verification techniques. In other instances, each data loader may execute different one or more verification techniques (e.g., such as the same verification techniques in a different order or different verification techniques, etc.). Example of verification techniques include, but are not limited to, checksums, cyclic redundancy checks (CRC), redundancies (e.g., comparing portions of a data segment to duplicate portion of the dataset, etc.), metadata, combinations thereof, and/or the like. For instance, a checksum (e.g., a hash value derived from a data segment) may be downloaded with a data segment (e.g., with the data segment, separately from the set of data segments). The data loader may derive a corresponding checksum using the downloaded data segment and compare the corresponding checksum to the checksum downloaded with the data segment. In some instances, each data segment may include a portion of other data segments such that upon downloading a data segment the corresponding data loader may request the duplicate data segment from another data loader and compare them to verify the integrity of the download.

When the computing device detects that each data segment has been modified, the first network may reintegrate the set of data segments into the snapshot of the dataset. In some examples, the first network may reintegrate the set of data segments in a particular order such as based on the keys of each data segment, the modification applied to each data segment, and/or the like. For instance, the modification applied to each data segment may be used to determine an order of each data segment within the snapshot of the dataset. Since each key may be unique, the keys of each data segment may similarly determine an order of each data segment (and/or each key/value pair) within the snapshot of the dataset. Upon completion of the download, an instance of the dataset is present at the remote environment and the first network. In some instances, the computing device may store the set of data segments in a temporary memory location of the first network. In those instances, the computing device may reintegrate the data segments into the snapshot of the dataset and move the snapshot of the dataset to working memory. Alternatively, the computing device may reintegrate the snapshot of the dataset by moving the data segments to working memory. The working memory may be any type of memory such as, but not limited to, cache memory (such as cache tiles, L1, L2, L3, etc.), magnetic memories, solid state memories, optical memories, combinations thereof, and/or the like). The working memory be a secure storage location configured for storing sensitive information.

In implementations where the computing device is a component of the first network, the computing device may manage the working memory of the first network. For instance, the computing device may remove the snapshot of the dataset to free memory for a subsequent snapshot of the dataset. The computing device may be configured to remove the snapshot of the dataset before downloading the subsequent snapshot of the dataset. Alternatively, the computing device may remove the snapshot of the dataset after the subsequent snapshot of the dataset is downloaded to preserve continuity of services of the first network and to prevent a download failure from causing service downtime. Alternatively, the computing device may remove the snapshot of the dataset based on expiration of a timer (e.g., where the timer may be based on the scheduler service, completion of the download, a download frequency, user input, a predetermined length, etc.), an event, user input, combinations thereof, and/or the like.

In implementations where the computing device is a component of the remote environment, computing device may manage the working memory of the first network from the remote environment. For instance, the computing device may cause the removal of the snapshot of the dataset to free memory for a subsequent snapshot of the dataset. The computing device may be configured to remove the snapshot of the dataset before downloading the subsequent snapshot of the dataset. Alternatively, the computing device may cause the removal of the snapshot of the dataset after the subsequent snapshot of the dataset is downloaded to preserve continuity of services of the first network and to prevent a download failure from causing service downtime.

Alternatively, the computing device may cause the removal of the snapshot of the dataset based on expiration of a timer (e.g., where the timer may be based on the scheduler service, completion of the download, a download frequency, user input, a predetermined length, etc.), an event, user input, combinations thereof, and/or the like.

The computing device may also manage the working memory of the temporary location. In some instances, the computing device may enable the temporary location to store of one or more sets of data segments (e.g., corresponding to one or more snapshots of the dataset) to enable the temporary location to operate as a redundant storage location of the dataset. In those instances, the temporary location may store a set of data segments corresponding to a previous instance of snapshot of the dataset from a previous download while also storing a set of data segments corresponding to a current instance of snapshot of the dataset. The redundancy storage may allow the first network to redownload the previous snapshot of the dataset should the current download fail. In other instances, the computing device may prevent the temporary location from storing the snapshot of the dataset and/or any information associated with the snapshot of the dataset (e.g., data segments, metadata, etc.) outside of the download process. For instance, the memory size of the snapshot of the dataset may be too large to maintain multiple copies of the dataset at the temporary location. Additionally, or alternatively, the dataset may include sensitive data that may be at a higher risk of exposure while present at the temporary location. As a result, the computing device may manage storage of the dataset to prevent storing snapshots of the dataset and/or any information associated with the download when a download is not in process.

For example, once the download is complete, the computing device may cause the removal of the set of data segments from the temporary location. The computing device may cause the removal of the set of data segments by transmitting a request to remove the set of data segments, directly deleting the set of data segments (e.g., using directory or console commands, API functions, etc.). Alternatively, the computing device may cause the removal of the snapshot of the dataset based on expiration of a timer (e.g., where the timer may be based on the scheduler service, completion of the download, a download frequency, user input, a predetermined length, etc.), an event (e.g., such as detecting completion of the download, detecting a new snapshot of the dataset, etc.), user input, combinations thereof, and/or the like.

Figure 5:
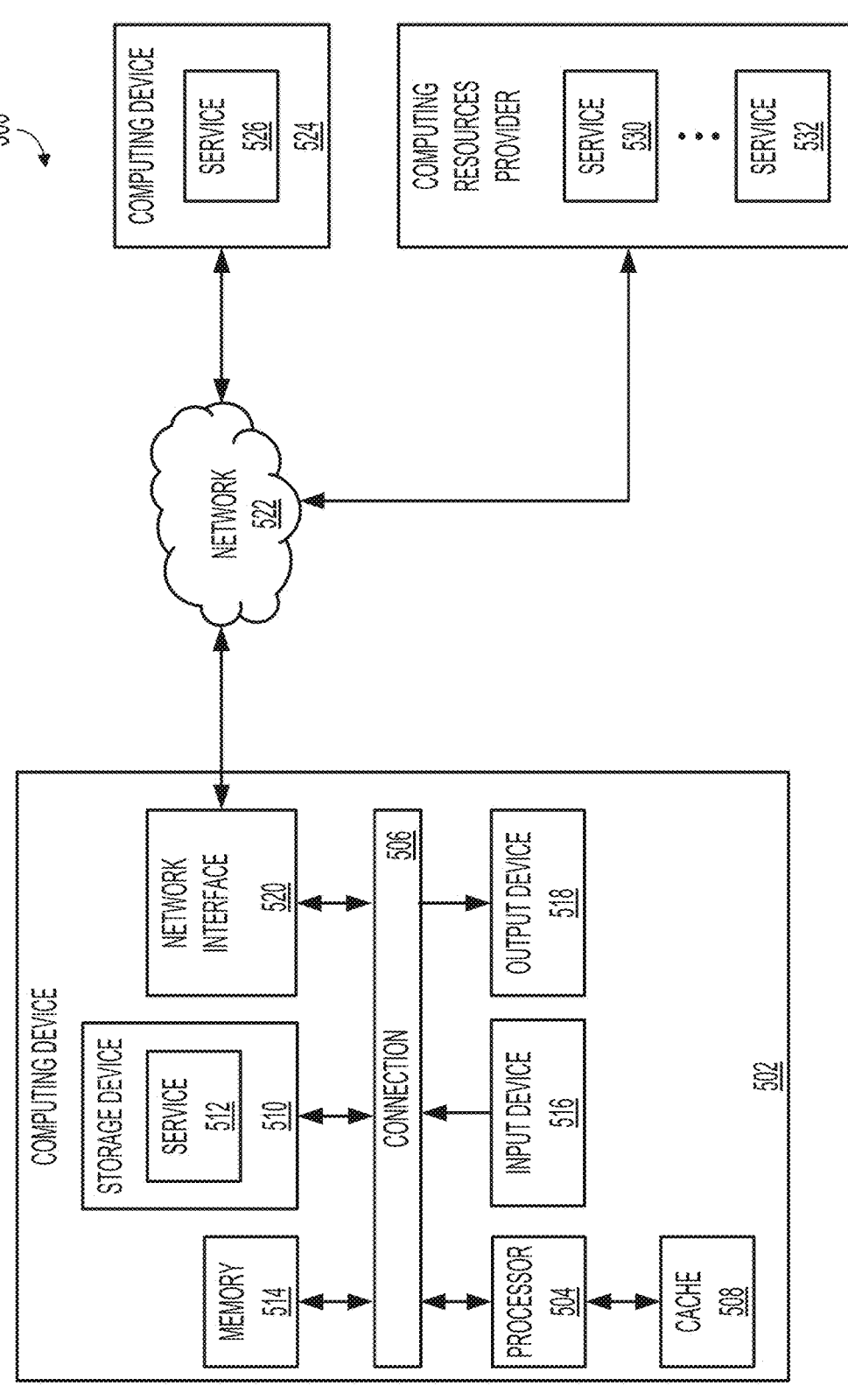
FIG. 5 illustrates an example computing device architecture of an example computing device that can implement the various techniques described herein according to aspects of the present disclosure.

FIG. 5 illustrates a computing system architecture including various components in electrical communication with each other according to aspects of the present disclosure. The example computing system architecture 500 illustrated in FIG. 5 includes a computing device 502, which has various components in electrical communication with each other using a connection 506, such as a bus, in accordance with some implementations. The example computing system architecture 500 includes a processing unit 504 that is in electrical communication with various system components, using the connection 506, and including the system memory 514. In some embodiments, the system memory 514 includes read-only memory (ROM), random-access memory (RAM), and other such memory technologies including, but not limited to, those described herein. In some embodiments, the example computing system architecture 500 includes a cache 508 of high-speed memory connected directly with, in close proximity to, or integrated as part of the processor 504. The system architecture 500 can copy data from the memory 514 and/or the storage device 510 to the cache 508 for quick access by the processor 504. In this way, the cache 508 can provide a performance boost that decreases or eliminates processor delays in the processor 504 due to waiting for data. Using modules, methods and services such as those described herein, the processor 504 can be configured to perform various actions. In some embodiments, the cache 508 may include multiple types of cache including, for example, level one (L1) and level two (L2) cache. The memory 514 may be referred to herein as system memory or computer system memory. The memory 514 may include, at various times, elements of an operating system, one or more applications, data associated with the operating system or the one or more applications, or other such data associated with the computing device 502.

Other system memory 514 can be available for use as well. The memory 514 can include multiple different types of memory with different performance characteristics. The processor 504 can include any general-purpose processor and one or more hardware or software services, such as service 512 stored in storage device 510, configured to control the processor 504 as well as a special-purpose processor where software instructions are incorporated into the actual processor design. The processor 504 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 504 can be a microprocessor, a microcontroller, a digital signal processor ("DSP"), or a combination of these and/or other types of processors. In some embodiments, the processor 504 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 500, an input device 516 can represent any number of input mechanisms, such as a microphone for speech, a touch-sensitive screen for gesture or graphical input, keyboard, mouse, motion input, pen, and other such input devices. An output device 518 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 500. In some embodiments, the input device 516 and/or the output device 518 can be coupled to the computing device 502 using a remote connection device such as, for example, a communication interface such as the network interface 520 described herein. In such embodiments, the communication interface can govern and manage the input and output received from the attached input device 516 and/or output device 518. As may be contemplated, there is no restriction on operating on any particular hardware arrangement and accordingly the basic features here may easily be substituted for other hardware, software, or firmware arrangements as they are developed.

In some embodiments, the storage device 510 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 510 can include hardware and/or software services such as service 512 that can control or configure the processor 504 to perform one or more functions including, but not limited to, the methods, processes, functions, systems, and services described herein in various embodiments. In some embodiments, the hardware or software services can be implemented as modules. As illustrated in example computing system architecture 500, the storage device 510 can be connected to other parts of the computing device 502 using the system connection 506. In some embodiments, a hardware service or hardware module such as service 512, that performs a function can include a software component stored in a non-transitory computer-readable medium that, in connection with the necessary hardware components, such as the processor 504, connection 506, cache 508, storage device 510, memory 514, input device 516, output device 518, and so forth, can carry out the functions such as those described herein.

The disclosed systems and services (e.g., the authentication systems of FIG. 8) can be performed using a computing system such as the example computing system illustrated in FIG. 5, using one or more components of the example computing system architecture 500. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some examples, the processor can be configured to carry out some or all of methods and systems described in connection with the authentication systems described herein by, for example, executing code using a processor such as processor 504 wherein the code is stored in memory such as memory 514 as described herein. One or more of a user device, a provider server or system, a database system, or other such devices, services, or systems may include some or all of the components of the computing system such as the example computing system illustrated in FIG. 5, using one or more components of the example computing system architecture 500 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital representative (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 528. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 504 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 514 can be coupled to the processor 504 by, for example, a connector such as connector 506, or a bus. As used herein, a connector or bus such as connector 506 is a communications system that transfers data between components within the computing device 502 and may, in some embodiments, be used to transfer data between computing devices. The connector 506 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 514 can include RAM including, but not limited to, dynamic RAM (DRAM), static RAM (SRAM), synchronous dynamic RAM (SDRAM), non-volatile random-access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 514 can also include magnetic or optical data storage media including read-only (e.g., CD ROM and DVD ROM) or otherwise (e.g., CD or DVD). The memory can be local, remote, or distributed.

As described above, the connector 506 (or bus) can also couple the processor 504 to the storage device 510, which may include non-volatile memory or storage, a drive unit, and/or the like. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 510. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 506 can also couple the processor 504 to a network interface device such as the network interface 520. The interface can include one or more of a modem or other such network interfaces including, but not limited to those described herein. It will be appreciated that the network interface 520 may be considered to be part of the computing device 502 or may be separate from the computing device 502. The network interface 520 can include one or more of an analog modem, Integrated Services Digital Network (ISDN) modem, cable modem, token ring interface, satellite transmission interface, or other interfaces for coupling a computer system to other computer systems. In some embodiments, the network interface 520 can include one or more input and/or output (I/O) devices. The I/O devices can include, by way of example but not limitation, input devices such as input device 516 and/or output devices such as output device 518. For example, the network interface 520 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 502 can be connected to one or more additional computing devices such as computing device 524 via a network 522 using a connection such as the network interface 520. In such embodiments, the computing device 524 may execute one or more services 526 to perform one or more functions under the control of, or on behalf of, programs and/or services operating on computing device 502. In some embodiments, a computing device such as computing device 524 may include one or more of the types of components as described in connection with computing device 502 including, but not limited to, a processor such as processor 504, a connection such as connection 506, a cache such as cache 508, a storage device such as storage device 510, memory such as memory 514, an input device such as input device 516, and an output device such as output device 518. In such embodiments, the computing device 524 can carry out the functions such as those described herein in connection with computing device 502. In some embodiments, the computing device 502 can be connected to a plurality of computing devices such as computing device 524, each of which may also be connected to a plurality of computing devices such as computing device 524. Such an embodiment may be referred to herein as a distributed computing environment.

The network 522 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 522 can be wired connections, wireless connections, or combinations thereof. Communications via the network 522 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 522, within the computing device 502, within the computing device 524, or within the computing resources provider 528 can include information, which also may be referred to herein as content. The information may include text, graphics, audio, video, haptics, and/or any other information that can be provided to a user of the computing device such as the computing device 502. In some embodiments, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 502 and presented to a user of the computing device 502 using forms that are perceptible via sight, sound, smell, taste, touch, or other such mechanisms. In some embodiments, communications over the network 522 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 502 and/or the computing device 524 can be connected to a computing resources provider 528 via the network 522 using a network interface such as those described herein (e.g., network interface 520). In such embodiments, one or more systems (e.g., service 530 and service 532) hosted within the computing resources provider 528 (also referred to herein as within "a computing resources provider environment") may execute one or more services to perform one or more functions under the control of, or on behalf of, programs and/or services operating on computing device 502 and/or computing device 524. Systems such as service 530 and service 532 may include one or more computing devices such as those described herein to execute computer code to perform the one or more functions under the control of, or on behalf of, programs and/or services operating on computing device 502 and/or computing device 524.

For example, the computing resources provider 528 may provide a service, operating on service 530 to store data for the computing device 502 when, for example, the amount of data that the computing device 502 exceeds the capacity of storage device 510. In another example, the computing resources provider 528 may provide a service to first instantiate a virtual machine (VM) on service 532, use that VM to access the data stored on service 532, perform one or more operations on that data, and provide a result of those one or more operations to the computing device 502. Such operations (e.g., data storage and VM instantiation) may be referred to herein as operating "in the cloud," "within a cloud computing environment," or "within a hosted virtual machine environment," and the computing resources provider 528 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 528 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, server-less hosting, combinations thereof, or the like. Various techniques to facilitate such services include, but are not limited to, virtual machines, virtual storage, database services, system schedulers (e.g., hypervisors), resource management systems, various types of short-term, mid-term, long-term, and archival storage devices, etc.

As may be contemplated, the systems such as service 530 and service 532 may implement versions of various services (e.g., the service 512 or the service 526) on behalf of, or under the control of, computing device 502 and/or computing device 524. Such implemented versions of various services may involve one or more virtualization techniques so that, for example, it may appear to a user of computing device 502 that the service 512 is executing on the computing device 502 when the service is executing on, for example, service 530. As may also be contemplated, the various services operating within the computing resources provider 528 environment may be distributed among various systems within the environment as well as partially distributed onto computing device 524 and/or computing device 502.

The following examples illustrate various aspects of the present disclosure. As used below, any reference to a series of examples is to be understood as a reference to each of those examples disjunctively (e.g., "Examples 1-4" is to be understood as "Examples 1, 2, 4, or 4").

Example 1 is a computer-implemented method comprising: receiving a request to load a dataset into a first network; dividing the dataset into one or more data segments, wherein each data segment of the one or more data segments is associated with a data loader of one or more data loaders of the first network; transferring the one or more data segments to a temporary location; and downloading, by one or more data loaders of the first network, the one or more data segments from the temporary location to the first network, wherein each data segment of the one or more data segments is downloaded by a separate data loader of the one or more data loaders.

Example 2 is the computer-implemented method of example(s) 1, wherein the first network is a cloud network.

Example 3 is the computer-implemented method of example(s) 1, wherein the one or more data segments are transmitted to the first network in parallel.

Example 4 is the computer-implemented method of example(s) 1, wherein the temporary location includes one or more cloud storage objects.

Example 5 is the computer-implemented method of example(s) 1, wherein dividing the dataset into the one or more data segments includes: determining a size of the dataset; and dividing the dataset into a quantity of data segments based on the size of the dataset and a quantity of data loaders available at the first network.

Example 6 is the computer-implemented method of example(s) 1, wherein the dataset is stored in a secured storage location.

Example 7 is the computer-implemented method of example(s) 1, further comprising: determining, by a particular data loader of the one or more data loaders, that a corresponding data segment at the temporary location includes new data; and downloading the corresponding data segment from the temporary location to the first network.

Example 8 is the computer-implemented method of example(s) 1, further comprising: determining that an age of the dataset is greater than a threshold; and deleting the dataset from the first network.

Example 9 is the computer-implemented method of example(s) 1, wherein the dataset is loaded by the first network in regular intervals.

Example 10 is the computer-implemented method of example(s) 1, wherein the one or more data segments are downloaded into cache tiles.

Example 11 is a system comprising: one or more processors; and a non-transitory computer-readable medium storing instructions that when executed by the one or more processors cause the one or more processors to perform the method of any of example(s)s 1-10.

Example 12 is a non-transitory computer-readable medium storing instructions that when executed by one or more processors cause the one or more processors to perform the method of any of example(s)s 1-10.

Client devices, computing devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 902) include, but is not limited to, desktop computers, laptop computers, server computers, hand-held computers, tablets, smart phones, personal digital representatives, digital home representatives, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, micro-controller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein. Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the example process of FIG. 4). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, linear classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital representative (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 602.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 45 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claims.

The invention claimed is:

1. A computer-implemented method comprising:
    receiving a request to load a dataset into a first distributed processing network, wherein the dataset is located at a second distributed processing network;
    dividing the dataset into one or more data segments, wherein each data segment of the one or more data segments is associated with a data loader of one or more data loaders of the first distributed processing network;
    transferring the one or more data segments to a temporary location within a third distributed processing network, wherein the one or more data segments are transferred in response to receiving the request to load the dataset, and wherein the second distributed processing network is distinct from the third distributed processing network;
    detecting the one or more data segments at the temporary location by executing a call from the first distributed processing network;
    downloading, by one or more data loaders of the first distributed processing network, the one or more data segments from the temporary location to the first distributed processing network, wherein the download is initiated in response to detecting the one or more data segments at the temporary location, and wherein each data segment of the one or more data segments is downloaded by a separate data loader of the one or more data loaders;
    modifying a first data segment of the one or more data segments downloaded by the one or more data loaders in response to downloading the first data segment; and deleting the first data segment from the temporary location.

2. The computer-implemented method of claim 1, wherein the first distributed processing network is a cloud network.

3. The computer-implemented method of claim 1, wherein the one or more data segments are downloaded to the first distributed processing network in parallel.

4. The computer-implemented method of claim 1, wherein the temporary location includes one or more cloud storage objects.

5. The computer-implemented method of claim 1, wherein dividing the dataset into the one or more data segments includes:
    determining a size of the dataset; and
    dividing the dataset into a quantity of data segments based on the size of the dataset and a quantity of data loaders available at the first distributed processing network.

6. The computer-implemented method of claim 1, wherein the dataset is stored in a secured storage location.

7. A system comprising:
    one or more processors; and
    a non-transitory computer-readable medium storing instructions that when executed by the one or more processors cause the one or more processors to perform operations including:
        receiving a request to load a dataset into a first distributed processing network, wherein the dataset is located at a second distributed processing network;
        dividing the dataset into one or more data segments, wherein each data segment of the one or more data segments is associated with a data loader of one or more data loaders of the first distributed processing network;
        transferring the one or more data segments to a temporary location within a third distributed processing network, wherein the one or more data segments are transferred in response to receiving the request to load the dataset, and wherein the second distributed processing network is distinct from the third distributed processing network;
        detecting the one or more data segments at the temporary location by executing a call from the first distributed processing network;
        downloading, by one or more data loaders of the first distributed processing network, the one or more data segments from the temporary location to the first distributed processing network, wherein the download is initiated in response to detecting the one or more data segments at the temporary location, and wherein each data segment of the one or more data segments is downloaded by a separate data loader of the one or more data loaders;
        modifying a first data segment of the one or more data segments downloaded by the one or more data loaders in response to downloading the first data segment; and
        deleting the first data segment from the temporary location.

8. The system of claim 7, wherein the first distributed processing network is a cloud network.

9. The system of claim 7, wherein the one or more data segments are downloaded to the first distributed processing network in parallel.

10. The system of claim 7, wherein the temporary location includes one or more cloud storage objects.

11. The system of claim 7, wherein dividing the dataset into the one or more data segments includes:

determining a size of the dataset; and dividing the dataset into a quantity of data segments based on the size of the dataset and a quantity of data loaders available at the first distributed processing network.

12. The system of claim 7, wherein the dataset is stored in a secured storage location.

13. A non-transitory computer-readable medium storing instructions that when executed by one or more processors cause the one or more processors to perform operations including:

receiving a request to load a dataset into a first distributed processing network, wherein the dataset is located at a second distributed processing network;

dividing the dataset into one or more data segments, wherein each data segment of the one or more data segments is associated with a data loader of one or more data loaders of the first distributed processing network;

transferring the one or more data segments to a temporary location within a third distributed processing network, wherein the one or more data segments are transferred in response to receiving the request to load the dataset, and wherein the second distributed processing network is distinct from the third distributed processing network;

detecting the one or more data segments at the temporary location by executing a call from the first distributed processing network;

downloading, by one or more data loaders of the first distributed processing network, the one or more data segments from the temporary location to the first distributed processing network, wherein the download is initiated in response to detecting the one or more data segments at the temporary location, and wherein each data segment of the one or more data segments is downloaded by a separate data loader of the one or more data loaders;

modifying a first data segment of the one or more data segments downloaded by the one or more data loaders in response to downloading the first data segment; and deleting the first data segment from the temporary location.

14. The non-transitory computer-readable medium of claim 13, wherein the first distributed processing network is a cloud network.

15. The non-transitory computer-readable medium of claim 13, wherein the one or more data segments are downloaded to the first distributed processing network in parallel.

16. The non-transitory computer-readable medium of claim 13, wherein the temporary location includes one or more cloud storage objects.

17. The non-transitory computer-readable medium of claim 13, wherein dividing the dataset into the one or more data segments includes:

determining a size of the dataset; and dividing the dataset into a quantity of data segments based on the size of the dataset and a quantity of data loaders available at the first distributed processing network.

18. The non-transitory computer-readable medium of claim 13, wherein the dataset is stored in a secured storage location.

* * * * *